3,159,582
STABLE SOLVENT COMPOSITIONS
Leslie L. Sims, Baton Rouge, La., assignor to Ethyl Corporation, New York, N.Y., a corporation of Virginia
No Drawing. Filed Feb. 23, 1960, Ser. No. 10,091
7 Claims. (Cl. 252—153)

This invention relates to the degreasing of metals. In particular, it relates to stable solvent compositions composed of 1,1,1-trichloroethane containing mixtures of stabilizing additives which prevent metal induced decomposition.

The problem of stabilizing chlorinated aliphatic hydrocarbons useful as solvents for degreasing metals has received considerable attention by skillful chemists over many years. During this course of time it has become increasingly apparent to all that the discoveries relative to the stabilization of particular chlorinated hydrocarbon solvents are neither applicable nor translatable to the problems of stabilizing other chlorinated hydrocarbon solvents. Even where a successful stabilizing additive has been found for a particular chlorinated hydrocarbon solvent, the stabilized composition still may not meet the rigorous requirements of commercial applications.

Insofar as stabilizing 1,1,1-trichloroethane (methyl chloroform) is concerned, the problems are even more acute. From the standpoint of metal induced decomposition, 1,1,1-trichloroethane departs drastically from other chlorinated hydrocarbons. For example, metals, especially aluminum, will last for days or weeks without being attacked by ordinary chlorinated hydrocarbon solvents, but in the presence of 1,1,1-trichloroethane, however, aluminum is vigorously attacked and the 1,1,1-trichloroethane solvent reduced to a blackened or charred mass within minutes. Only a few stabilizers are known which are reasonably effective in inhibiting 1,1,1-trichloroethane against such attack and why these few stabilizers are effective is not known. The mere fact however that a stabilizer will inhibit decomposition of other chlorinated hydrocarbons means absolutely nothing in relation to stabilizing 1,1,1-trichloroethane.

The provision of an effective vapor phase stabilizer for 1,1,1-trichloroethane involves even more complications. In this instance the stabilizer must serve a dual requirement, e.g., it must stabilize the 1,1,1-trichloroethane in the vapor phase as well as in the liquid phase. Moreover, the stabilizer must be sufficiently volatile to provide a sufficient quantity of stabilizer in the vapor of the solvent to inhibit the vapor but the stabilizer must not be so volatile as to unduly deplete the liquid phase. In addition, the rate and extent of metal induced decomposition are intensified with increasing temperature, elevated temperatures often being desirable to effect degreasing.

It is accordingly an object of this invention to provide stabilized compositions which are highly effective for degreasing aluminum and other metals. A particular object is to provide 1,1,1-trichloroethane solvent compositions which retain chemical passivity during repeated cycles of exposure to metals at processing conditions, and against the degradation influences of moisture, elevated temperature, contact with metals and metal halides, and light. Another object of the present invention is to provide compositions especially suitable for the vapor phase degreasing of aluminum and other metals. A further object is to provide additive compositions especially adapted for use in methyl chloroform as stabilizers therefor.

These and other objects are achieved according to the present invention which comprises forming a stable 1,1,1-trichloroethane solvent composition by dissolving within the 1,1,1-trichloroethane a minor and stablizing quantity of a mixture of additives consisting essentially of nitromethane, an amine and an acetylenic alcohol.

Thus, in accordance with the practice of this invention there are provided stable solvent compositions for degreasing metals comprising 1,1,1-trichloroethane containing stabilizing mixtures of additives in quantities sufficient to inhibit the 1,1,1-trichloroethane against metal induced decomposition. The stabilizing mixtures are composed of nitromethane, an amine, generally containing from about 2 to about 18 carbon atoms, and an acetylenic alcohol, generally containing from 3 to about 10 carbon atoms.

In a preferred embodiment sufficient quantities of stabilizing mixtures, composed of nitromethane, an amine and an acetylenic alcohol, are added to 1,1,1-trichloroethane to form compositions which inhibit against metal induced decomposition. These inhibited compositions are used to degrease the surfaces of metals by contacting the metals therewith. Generally the amine employed is one containing from about 2 to about 18 carbon atoms and the alcohol employed is generally a monohydric acetylenic alcohol containing from 3 to about 10 carbon atoms.

In another preferred embodiment sufficient quantities of stabilizing mixtures, composed of nitromethane, an amine containing from about 2 to about 7 carbon atoms, and a monohydric acetylenic alcohol containing from about 3 to about 5 carbon atoms, are added to 1,1,1-trichloroethane to form compositions, the liquid and vapors of which are inhibited against metal induced decomposition at metal degreasing conditions. Thus, these stabilized compositions are useful in degreasing processes wherein 1,1,1-trichloroethane vapor, in equilibrium with liquid 1,1,1-trichloroethane, is contacted with the surfaces of metals.

In accordance with the practice of this invention, 1,1,1-trichloroethane is provided with a corrosion inhibitor composition comprising a mixture of from about 10 percent to about 80 percent nitromethane, from about 10 to about 80 percent of an amine, and from about 10 to about 80 percent of a monohydric acetylenic alcohol, based on the total weight of the corrosion inhibitor composition, said amine containing from about 2 to about 18 carbon atoms and the monohydric acetylenic alcohol containing from 3 to about 10 carbon atoms. Thus, the stabilizing component (or components) present in least quantity is present in at least 10 percent by weight, based on the sum total weight of the stabilizing mixture of inhibitors.

A suitable corrosion inhibitor for vapor phase stabilization of 1,1,1-trichloroethane is one comprising from about 10 percent to about 80 percent nitromethane, from about 10 percent to about 80 percent of an amine, and from about 10 percent to about 80 percent of a monohydric acetylenic alcohol, based on the total weight of the corrosion inhibitor composition, said acetylenic alcohol containing from about 3 to about 5 carbon atoms, and the amine containing from about 2 to about 7 carbon atoms.

The amine employed can be primary, secondary or tertiary and the substituents attached to the nitrogen atom, or atoms, can be alkyl, aryl, aralkyl, hydrogen, heterocyclic radicals or mixtures of any of these. Within the scope of the invention also are included those nitrogenous basic compounds wherein the amino nitrogen, or nitrogens, is within the nucleus of an aromatic or cyclic structure. Various sulfur, phosphorus, oxygen, halogen or nitrogen derivatives of these amines are also included within the scope of this invention. Generally however a hydrocarbyl amine containing not more than 2 amino nitrogen atoms in the molecule is preferred because of the high effectiveness of these compounds as inhibitors in the practice of this invention. A hydrocarbyl tertiary amine having only one nitrogen and containing only alkyl groups, each alkyl group having from about 2 to about 6 carbon atoms, is especially preferred because of the very high effectiveness of these compounds as stabilizers in combination with nitromethane and the various acetylenic alcohols. Such tertiary amines having up to about 7 carbon atoms are very useful as vapor phase stabilizers as well as liquid phase stabilizers.

Preferably the acetylenic alcohols are aliphatic monohydric acetylenic alcohols containing from 3 to about 10 carbon atoms. Such compounds can be straight chain or branched chain and can include up to about 2 substituents, halogen, nitrogen, sulfur and the like, within the molecule. Especially preferred alcohols however are unsubstituted aliphatic monohydric acetylenic alcohols containing from 3 to about 6 carbon atoms. These alcohols provide excellent liquid and vapor stabilizing properties and are fairly economically provided.

The above classes of amines and alcohols generally having boiling points from about 50 C. to about 150° C. are generally suitable as vapor phase stabilizers for 1,1,1-trichloroethane when used in combination with nitromethane. A more preferred class of amines and alcohols for vapor phase stabilizers however are those compounds having boiling points between about 65° C. and about 115° C. For example, a highly preferred vapor phase stabilizing mixture includes nitromethane, triethylamine and 2-methyl-3-butyn-2-ol.

The use of nitromethane as an inhibitor for 1,1,1-trichloroethane is taught in my co-pending application S.N. 769,546, filed October 27, 1958, and now abandoned. The present invention is an improvement over the invention described and claimed in that application and is based on the discovery that the value and effectiveness of nitromethane as a stabilizer for 1,1,1-trichloroethane can be even further enhanced by the addition thereto of an amine and an acetylenic alcohol.

Thus, when the amine and the acetylenic alcohol are used in conjunction with nitromethane, the resultant three-component stabilizing additive is far more effective as an additive for 1,1,1-trichloroethane than nitromethane itself. In fact, the three component stabilizing mixture of additives is far more effective for stabilizing 1,1,1-trichloroethane than any two component mixture of the foregoing additives.

The outstanding potency of this triumvirate of stabilizers is an enigma. Thus, in U.S. 2,838,458 it is taught that alcohols, including acetylenic alcohols, are quite ineffective as inhibitors or stabilizers for methyl chloroform. Amines are also generally ineffective as stabilizers for 1,1,1-trichloroethane. Yet when these two generally ineffective materials (acetylenic alcohol and amine) are combined with nitromethane pursuant to this invention, the resultant mixture of additives is greatly enhanced in stabilizing potency and is a highly effective stabilizing mixture for 1,1,1-trichloroethane.

The following representative experimental data provide a sound basis for a clear appreciation of this invention. The demonstration immediately following shows the effectiveness of the stabilized solvent when stabilized with nitromethane alone and subjected to rather rigorous conditions.

A solution of 1,1,1-trichloroethane plus 2.1 weight percent of nitromethane was charged into a containing vessel. A sufficient quantity of hydrogen chloride was then added to the mixture to form a 0.0023 molar solution of hydrogen chloride in the 1,1,1-trichloroethane. One part by weight of aluminum chloride, based on 100 parts by weight of 1,1,1-trichloroethane charged, was added to the vessel. The hydrogen chloride and aluminum chloride added thus formed an even more rigorous test than would have resulted without the addition of these components. A tared work piece composed of polished aluminum metal was then partially immersed within the liquid solvent. Thus, a portion of the metal was covered with liquid and a portion was exposed only to the vapors of the 1,1,1-trichloroethane solvent. The temperature of the solvent was then raised to 74° C. and the contents of the vessel subjected to diffused light. These conditions were maintained for a period of 5 days. After the end of which time the contents of the vessel were examined. There was not the slightest decomposition of the 1,1,1-trichloroethane. The aluminum work piece, including that portion exposed only to the vapors, was unattacked.

In order to contrast the benefits derived from the use of stabilized 1,1,1-trichloroethane, the following demonstration was performed under less rigorous conditions but without the benefits of nitromethane to stabilize the 1,1,1-trichloroethane.

A polished aluminum workpiece was completely immersed in pure, dry 1,1,1-trichloroethane within a containing vessel. The contents of the vessel were maintained at room temperature, approximately 25° C., and subjected only to diffused light. Within three minutes a visible bubbling reaction began with discoloration of the 1,1,1-trichloroethane and deposition of carbonaceous material. At the end of 25 minutes the aluminum workpiece was withdrawn from the 1,1,1-trichloroethane solvent which was by that time completely opaque. The aluminum workpiece was badly corroded and portions thereof had been completely eaten away.

A similar aluminum workpiece was next suspended over a vessel of boiling unstabilized 1,1,1-trichloroethane so that the vapors condensed upon the surfaces of the workpiece, and the condensed liquid formed permitted to drip back into the vessel. Within a few minutes the aluminum workpiece had been severely corroded and portions thereof had been completely destroyed.

The following demonstration illustrates the ineffectiveness of amines when used alone in 1,1,1-trichloroethane, even for only a very short period of time.

1,1,1-trichloroethane and trimethylamine were blended together to form a solution containing 0.28 percent by weight of triethyl amine, and this mixture was charged into a containing vessel. Then, hydrogen chloride was added to the solution to form a 0.0023 molar solution of hydrogen chloride in the 1,1,1-trichloroethane. One part of aluminum chloride, per 100 parts of 1,1,1-trichloroethane, was added to the vessel. A polished aluminum metal workpiece was then partially immersed within the solvent. The temperature of the solvent was raised to 74° C. and the contents of the flask were subjected to diffused light. These conditions were maintained for a period of 1½ hours at the end of which time the contents of the vessel were examined. There was evidence of considerable decomposition of the 1,1,1-trichloroethane and the aluminum metal workpiece had been severely attacked. Generally similar results were obtained with various other amines of the type described above.

In the following demonstration a typical acetylenic alcohol was used in 1,1,1-trichloroethane. This composition was ineffective and is exemplary of the ineffectiveness of acetylenic alcohols in general when used alone in methylchloroform.

Thus, the last demonstration described above was repeated except that 2-methyl-3-butyn-2-ol replaced the amine. The contents of the vessel were subjected to the same conditions as in the previous demonstration. Again there was considerable evidence of decomposition of the 1,1,1-trichloroethane and the aluminum metal workpiece had undergone considerable attack.

The following demonstrations show the distinct advantages of the present three component stabilizing mixtures for 1,1,1-trichloroethane as contrasted with even nitromethane, a highly effective stabilizer for 1,1,1-trichloroethane.

The demonstration immediately following shows 1,1,1-trichloroethane stabilized with nitromethane alone and under extremely rigorous conditions.

In this demonstration tared lengths of iron, copper and aluminum were immersed within a vessel containing a 0.43 weight percent solution of nitromethane in 1,1,1- trichloroethane. Next, hydrogen chloride was added in quantity sufficient to form a 0.0023 molar solution of hydrogen chloride in 1,1,1-trichloroethane and 1 part by weight of aluminum chloride per 160 parts of 1,1,1-trichloroethane were added to the vessel. The temperature of the solvent was then raised to 74° C. and the contents of the vessel subjected to diffuse light. These extremely rigorous conditions were maintained for a period of 1½ hours. At the end of this time the contents of the vessel were examined. There was considerable evidence of decomposition within the 1,1,1-trichloroethane solvent, and there was also evidence of chemical attack upon the surfaces of the metals both as regards the metal exposed to the liquid and those portions exposed only to the vapor. Reweighing of these metals showed that 25 percent by weight of the aluminum metal has been eaten away by the solvent. The weight loss of the iron metal, as contrasted with its original weight, was 0.22 weight percent and that of the copper metal was 0.57 weight percent.

The following example repeated the foregoing demonstration under even more rigorous conditions but here a three-component stabilizing mixture in accordance with the practice of this invention was added to the 1,1,1-trichloroethane. The results obtained were in sharp contrast even with the highly satisfactory results obtained in the foregoing demonstration.

*Example I*

The foregoing demonstration was repeated in all details except that in this instance the reflux time was extended from 1½ hours to 21½ hours, and a three-component stabilizer system of this invention was employed instead of the nitromethane alone.

Thus, to the 1,1,1-trichloroethane contents of the vessel were added sufficient quantities of nitromethane, triethylamine and 2-methyl-3-butyn-2-ol to form a solution containing 0.14 weight percent, 0.088 weight percent, and 0.11 weight percent of nitromethane, triethylamine and 2-methyl-3-butyn-2-ol, respectively. At the end of 21½ hours of test exposure the contents of the vessel were examined as in the foregoing demonstration. There was not the slightest visible evidence of any decomposition of the 1,1,1-trichloroethane solvent nor was there any visible evidence of chemical attack upon the metals. Reweighing of the lengths of metal showed an extremely small weight percent loss, i.e., 0.06 weight percent for aluminum, 0.02 weight percent for iron and 0.04 weight percent loss for copper. The excellent stabilizing properties of the triumvirate system of stabilizing additives is therefore clear.

*Example II*

The foregoing example is repeated in all details except that in this instance a 2-weight percent concentration (the individual stabilizers being added in equal weight concentrations) of the stabilizing mixture of nitromethane, triethylamine and 2-methyl-3-butyn-2-ol in 1,1,1-trichloroethane is used and the refluxing is conducted for a period of 5 days. The stabilizing effect of the stabilizer system, as evidenced by the time required for the metal strips to show any loss of weight, is superior to the results obtained in the foregoing example wherein a smaller concentration of the stabilizers were added to the 1,1,1-trichloroethane solvent.

*Example III*

The foregoing example is again repeated except that in this instance a 5 weight percent solution of the stabilizing mixture of nitromethane, 2-methyl-3-butyn-2-ol and triethylamine in 1,1,1 - trichloroethane is formed. The nitromethane, 2-methyl-3-butyn-2-ol and triethylamine are contained within the stabilizing mixture of additives, relative to each other respectively, in a 5:3:1 weight ratio. Superior results are again obtained as evidenced by the water white solvent and the lack of any chemical attack upon the lengths of metal.

*Example IV*

Examples I–III are repeated in all details except that in these instances 2-methyl-3-butyn-2-ol is replaced by other alcohols containing greater than 6 carbon atoms. The alcohols employed are the following compounds respectively:

2-propyl-3-butyn-2-ol,
2-phenyl-3-butyn-2-ol,
3-propyl-4-pentyn-3-ol,
2-chloro-3-propyl-4-pentyn-3-ol,
2-chloro-3-amyl-4-pentyn-3-ol,
3-phenoxy-4-pentyn-3-ol,
2-chloro-3-phenoxy-4-pentyn-3-ol,
2-methyl-4-pentyn-3-ol, and
3-propyl-6-heptyn-3-ol.

Again, the results obtained are highly satisfactory inasmuch as there is very little evidence of solvent decomposition. The solvent remains almost water white and the metals show only slight signs of any chemical attack.

*Example V*

Examples I–III are again repeated in all details except that in these instances 2-methyl-3-butyn-2-ol is replaced by other alcohols containing from 3 to 6 carbon atoms. The compounds employed are: propargyl alcohol, 3-butyn-1-ol, 3-butyn-2-ol, and 2-ethyl-3-butyn-2-ol.

These alcohols prove even superior to those of the foregoing Example IV inasmuch as the solvent remains essentially water white and the metals show almost no evidence of chemical attack.

*Example VI*

Examples I–III are against repeated except that in these instances hydrocarbyl tertiary amines, in which each alkyl group has from about 2 to about 6 carbon atoms within the molecule, are employed, respectively: methyl diethylamine, triethylamine, tripropylamine, diethylpropylamine, methylethylpropylamine, tributylamine, ethyldibutylamine, triamylamine, methylethylamylamine, and trihexylamine.

Excellent results are obtained. There is no sign of solvent decomposition nor of chemical attack upon the metals.

*Example VII*

Examples I–III are again repeated except that in these instances the amines employed are the following compounds, respectively: diphenylamine, o-toluidine, p-xylidine, 1-naphthylamine, 3-biphenylamine, furfurylamine, 1-indanethylamine, 1,4 - antradiamine, 3,3 - biphenyldiamine, 3,4-diphenyldiamine, 2-amino-pyrrole, 26-diaminopyridine, 2,4-diamino-5-pyrimidine, 1-aminoacridine, anthranilic acid, metalinic acid, ecgonine, picoline, and brucine. Highly satisfactory results are obtained, though the results obtained are generally not quite as good as when the amines of Example VI are employed.

*Example VIII*

Examples I–III are again repeated except that in these instances the amines employed are those having greater than 2-amino nitrogens within the compound. The compounds employed are, respectively: 1,2,3-benzenetriamine, 1,4,6-naphthylenetriamine, 3,3',5'-biphenyltriamine, 3,4,5-biphenyltriamine diethylenetriamine, triethylenetetraamine, 2,6-diaminopyridine, 2,4-diamino-5-aminomethylpyrimidine, 2,5-diamino-1,3,4-thiadiazole and heptaethyleneoctamine.

Again, highly satisfactory results are obtained.

*Example IX*

Examples I–III are again repeated in all details except that in these instances each of the amines named in the above Examples VI–VIII is added with nitromethane and each of the following alcohols to the 1,1,1-trichloroethane to form stabilized compositions, e.g., propargyl alcohol, 2-ethyl-3-butyn-2-ol, 1-chloro-2-benzyl-3-butyn-2-ol, 1,1-dichloro-2-methyl-3-butyn-2-ol, 2-ethyl-5-hexyn-4-ol, 2,2-diethyl-5-hexyn-4-ol, 2-methyl-2-ethyl-5-hexyn-4-ol, and 4-phenyl-5-hexyn-3-ol. Again highly satisfactory results are obtained and there is little evidence of solvent decomposition or of chemical attack upon the metals.

*Example X*

Examples I–III were repeated in all details except that the lengths of metal were suspended above the vessel such that the vapors emitted from the solvent condensed thereupon and ran back into the vessel. As in those examples, excellent results were obtained.

Again there was no evidence of decomposition of the metals and the solvent remained water white.

A variety of corrosion inhibitor compositions are formed. The components of the corrosion inhibitor compositions and the weight percent of each component within the respective corrosion inhibitor composition is as shown in the following table:

| Example | Nitromethane, percent | Amine | Alcohol |
| --- | --- | --- | --- |
| XI | 10 | 10% Triethylamine | 80% Propargyl alcohol. |
| XII | 50 | 25% Tributylamine | 25% 2-Methyl-3-butyn-1-ol. |
| XIII | 80 | 10% Ethyldibutylamine. | 10% 2-Methyl-3-butyn-2-ol. |
| XIV | 80 | 10% Triheptylamine | 10% 3-Butyn-1-ol. |
| XV | 10 | 40% Dibutylamine | 50% 5-Hexyn-4-ol. |
| XVI | 20 | 50% N-Octylamine | 30% 2-Propyl-3-butyn-2-ol. |
| XVII | 30 | 60% N-Decylamine | 10% 2-Propyl-3-pentyn-2-ol. |
| XVIII | 40 | 50% Dihexylamine | 10% 3-Ethyl-4-methyl-4-hexyn-3-ol. |
| XIX | 20 | 40% Triisoamylamine | 40% 3-Butyl-4-hexyn-3-ol. |
| XX | 10 | 80% Trihexylamine | 10% 2-Methyl-3-butyl-4-hexyn-3-ol. |
| XXII | 10 | 30% N,N′ Tetramethyl 3,3′-Diphenyldiamine. | 60% 3-Phenyl-4-hexyn-3-ol. |
| XXIII | 10 | 20% 1,2-Diamino acridine. | 70% 2-Phenyl-4-heptyn-2-ol. |

The stabilizing mixtures or corrosion inhibitor compositions shown in Examples XI–XIV are added to 1,1,1-trichloroethane to form stabilized 1,1,1-trichloroethane compositions. The corrosion inhibitor compositions are added to the 1,1,1-trichloroethane in sufficient quantity to form 0.5, 1, 2, 4, 5 and 10 weight percent compositions of the stabilizing mixtures in 1,1,1-trichloroethane.

Example I is repeated with each of these stabilized 1,1,1-trichloroethane compositions except that the strips of metal are suspended above the vessel so that the vapors emitted from the solvent are condensed thereupon. As in Example I the solvents show little or no signs of decomposition. The metals also show little or no signs of chemical attack.

When Examples XI–XIV are repeated with the metals completely immersed within the stabilized 1,1,1-trichloroethane solvent, similar results are obtained.

The corrosion inhibitor compositions of Examples XV–XXIII are added to 1,1,1-trichloroethane in sufficient quantity to form 0.5, 1, 2, 4, 5 and 10 weight percent compositions of the stabilizing mixtures in 1,1,1-trichloroethane. Example I is then repeated with each of these compositions. As in Example I the solvent compositions show little or no signs of decomposition and the metals are essentially unattacked.

In the practice of this invention, a minor concentration of the triumvirate of components, or the three-component stabilizing mixture, is added to the 1,1,1-trichloroethane. Any concentration of these compounds will produce some stabilizing effect, and the quantity of the stabilizing mixture to be added is therefore largely contingent upon the use for which the stabilized solvent will be employed. Generally, however, from about 0.5 to about 10 weight percent of the total weight of the mixture of additives, or the triumvirate of components, is added to the 1,1,1-trichloroethane. This forms a highly effective system which resists the deteriorating influences such as contact with aluminum and other metals, salts of such metals, light, and elevated temperatures. A preferred concentration of the stabilizing mixture is from about 1 to 4 weight percent in 1,1,1-trichloroethane. At least about 10 percent by weight, based on the total weight of the stabilizing mixture, of the stabilizer component present in least amount should be present in the stabilizing mixture. In absolute amounts, at least from about 0.05 weight percent to about 0.10 weight percent, based on the total weight of the stabilized 1,1,1-trichloroethane solvent, of the component present in least amount should be present. Preferably, the amine compound is present in a weight concentration of from about 0.1 percent to about 0.4 percent, based on the weight of the 1,1,1-trichloroethane stabilized solvent. Preferably, also, the acetylenic alcohol is present in a weight concentration of from about 0.5 percent to about 2 percent, based on the total weight of the stabilized 1,1,1-trichloroethane solvent. Also, preferably, the nitromethane is present in a weight concentration of from about 0.5 percent to about 2 percent, based on the total weight of the stabilized 1,1,1-trichloroethane. As stated, for greatest effectiveness all three compounds of the stabilizing mixture of components must be present.

As heretofore stated, a wide variety of acetylenic alcohols are suitable for the practice of this invention. A preferred class of such alcohols are those containing from 3 to about 6 carbon atoms. Illustrative of such compounds are propargyl alcohol, 2-methyl-3-butyn-2-ol, 2-ethyl-3-butyn-2-ol, 1-chloro-2-ethyl-3-butyn-2-ol, and 1,1-dibromo-2-methyl-3-butyn-2-ol. Those acetylenic alcohols having not more than about 5 carbon atoms are generally highly useful as vapor phase stabilizing components. Other highly suitable acetylenic alcohols are those containing up to 10 carbon atoms such as 2-propyl-3-butyn-2-ol, 2-ethyl-5-hexyn-4-ol, 2-butyl-5-hexyn-4-ol, and the like. Other suitable acetylenic alcohols are those containing greater than 10 carbon atoms, for example, 2-phenyl-3-ethynyl-4-pentyn-2-ol, and the like.

Highly preferred amines are those hydrocarbyl tertiary amines containing only alkyl groups in which each alkyl group has from about 2 to about 6 carbon atoms, for example, triethylamine, methyldiethylamine, tributylamine, triamylamine, trihexylamine, and the like. Those amines having not more than about 7 carbon atoms are generally useful as vapor phase stabilizing components. Highly preferred amines also are those hydrocarbyl amines containing not more than 2 amino nitrogen atoms in the molecule such as tripropylamine, aniline, m-toluidine, 2,4-xylidine, mesidine, 4-naphthylamine, 4-biphenylamine, o-phenylenediamine, 1,3-anthradiamine, 1,2-butanediamine, 1,4-naphthylenediamine, 3-aminopyrrole, and the like. Other highly useful amines includes 1,4-diaminoacridine, 2-amino-1,3,4-thiadiazole, and the like.

Having described the invention what is claimed is:

1. A stable solvent composition for the degreasing of metals consisting essentially of 1,1,1-trichloroethane containing from about 0.5 to about 10 weight percent of a stabilizing mixture sufficient to inhibit the 1,1,1-trichloroethane against metal induced decompositions; said stabilizing mixture consisting essentially of nitromethane, a hydrocarbyl tertiary amine containing only alkyl groups, each alkyl group having from about 2 to about 6 carbon atoms, and a monohydric acetylenic alcohol containing from 3 to about 6 carbon atoms; and wherein the component of the stabilizing mixture present in least quantity is present in at least 10 percent by weight based on the sum total weight of the stabilizing mixture.

2. The composition of claim 1 wherein from about 1 to about 4 percent of the stabilizing mixture is contained within the 1,1,1-trichloroethane.

3. A stable solvent composition for the degreasing of metals comprising 1,1,1-trichloroethane containing from about 0.5 to about 10 percent of a stabilizing mixture consisting essentially of nitromethane, triethyl amine and 2-methyl-3-butyn-2-ol; and wherein the component of a stabilizing mixture present in least quantity is present in at least 10 percent by weight, based on the sum-total weight of the stabilizing mixture.

4. The composition of claim 3 wherein the stabilizing mixture is contained within the 1,1,1-trichloroethane at a concentration of from about 1 to about 4 percent.

5. In a degreasing process wherein 1,1,1-trichloroethane vapor, in equilibrium with liquid 1,1,1-trichloroethane, is contacted with the surfaces of metals, the method of inhibiting the 1,1,1-trichloroethane vapor against decomposition comprising maintaining within the liquid 1,1,1-trichloroethane a stabilizing mixture in quantity in the range of from about 0.5 to about 10 weight percent sufficient to inhibit the 1,1,1-trichloroethane against decomposition; said stabilizing mixture consisting essentially of nitromethane, an amine containing from about 2 to about 7 carbon atoms and a monohydric acetylenic alcohol containing from 3 to about 5 carbon atoms; and wherein the component of a stabilizing mixture present in least quantity is present in at least 10 percent by weight, based on the sum-total weight of the stabilizing mixture.

6. The process of claim 5 wherein the stabilizing mixture maintained within the 1,1,1-trichloroethane consists essentially of nitromethane, triethyl amine and 2-methyl-3-butyn-2-ol.

7. A 1,1,1-trichloroethane corrosion inhibitor composition comprising a mixture of from about 10 to about 80 percent nitromethane, from about 10 to about 80 percent of triethyl amine and from about 10 to about 80 percent of 2-methyl-3-butyn-2-ol.

References Cited in the file of this patent

UNITED STATES PATENTS

| | | |
|---|---|---|
| 2,838,458 | Bachtel | June 10, 1958 |
| 2,923,747 | Rapp | Feb. 2, 1960 |
| 2,981,759 | Cole et al. | Apr. 25, 1961 |

FOREIGN PATENTS

| | | |
|---|---|---|
| 773,187 | Great Britain | Apr. 24, 1952 |
| 794,700 | Great Britain | May 7, 1958 |
| 579,408 | Canada | July 14, 1959 |